United States Patent [19]

Engelke et al.

[11] Patent Number: 5,081,673

[45] Date of Patent: Jan. 14, 1992

[54] VOICE BRIDGE FOR RELAY CENTER

[76] Inventors: Robert M. Engelke, 2510 Marshall Pkwy., Madison, Wis. 53713; Kevin Colwell, 5214 Camilla Rd., Madison, Wis. 53716

[21] Appl. No.: 616,720

[22] Filed: Nov. 16, 1990

Related U.S. Application Data

[63] Continuation of Ser. No. 255,357, Oct. 11, 1988, abandoned.

[51] Int. Cl.$^5$ .................................. H04M 11/00
[52] U.S. Cl. .................................. 379/98; 379/52; 379/96
[58] Field of Search ............... 379/52, 93, 96, 97, 379/98, 214; 340/825.19

[56] References Cited

U.S. PATENT DOCUMENTS

| | | | |
|---|---|---|---|
| 3,585,303 | 6/1971 | Chieffo | 379/52 |
| 3,896,267 | 7/1975 | Sachs et al. | 379/52 |
| 4,012,599 | 3/1977 | Meyer | 379/52 |
| 4,191,854 | 3/1980 | Coles | 379/52 |
| 4,268,721 | 5/1981 | Nielson et al. | 379/52 |
| 4,426,555 | 1/1984 | Underkoffler | 379/52 |
| 4,503,288 | 3/1985 | Kassler | 379/96 |
| 4,524,244 | 6/1985 | Faggin et al. | 379/96 |
| 4,650,927 | 3/1987 | James | 379/52 |

FOREIGN PATENT DOCUMENTS

| | | | |
|---|---|---|---|
| 0055649 | 4/1982 | Japan | 379/52 |
| 0134568 | 8/1983 | Japan | 379/52 |
| 2183880 | 6/1987 | United Kingdom | 379/52 |

Primary Examiner—Jin F. Ng
Assistant Examiner—Stella L. Woo
Attorney, Agent, or Firm—Quarles & Brady

[57] ABSTRACT

A relay center has a first telephone line (12) and a second telephone line (14). Data signals may be carried on the first telephone line (12) and received into a modem (20). A terminal or computer (22) then receives the data signals and converts the signals into readable characters viewable on a display (26). An operator then reads messages formed by the characters and voices them into a telephone (28) connected to the second telephone (14). The operator may also receive spoken words through the telephone (28) and transcribe via a keyboard (24) for transmission of data signals by the modem (20) and carried on the first telephone line (12). Upon a command received through the first telephone line (12) or made by the operator, a voice bridge (10) may be established which establishes a direct vocal link from either the first telephone line (10) to the second telephone line (12) or from the second telephone line (12) to the first telephone line (14). A second command disconnects the telephone (28) from the second telephone line (14) to prevent the operator from hearing the audio sounds carried by the voice bridge (10).

17 Claims, 1 Drawing Sheet

VOICE BRIDGE FOR RELAY CENTER

This application is a continuation of application Ser. No. 07/255,357, filed Oct. 11, 1988, now abandoned.

FIELD OF THE INVENTION

The present invention relates generally to relay centers that allow telephone communication between a hearing-impaired party using telecommunications devices for the deaf (TDD) and a non-TDD equipped hearing party, and particularly pertains to a voice bridge that allows voice to pass in one direction through the relay.

BACKGROUND OF THE INVENTION

The deaf or hearing-impaired that cannot hear well enough to use the telephone use communication terminals to converse over telephone lines. Such terminals are referred to as telecommunication devices for the deaf, or TDDs, and are comprised of a keyboard and display. TDDs are connected to a telephone line through a modem which allows the terminal to transmit information over a telephone line to another electronic device which is connected to the telephone line through another modem. When characters are typed by a first party on the keyboard of a first terminal, tones corresponding to the characters are transmitted via the modem through the telephone line to a second terminal. At the second terminal, the tones are received by a second modem and converted back to characters to be read by a second party. In this manner, a conversation proceeds by the taking of turns by each of the users in the typing back and forth on the TDDs. In order to have a TDD conversation, however, both parties must have a TDD.

It is often necessary or desirable for a TDD user to call a telephone number that is not equipped with a TDD. These calls may be either emergency or non-emergency, e.g. telephone calls to police, employers, doctors, repair and maintenance workers, relatives and loved ones, etc. In order to make possible telephone calls between a TDD user and a non-TDD equipped telephone number, TDD relay centers have been established in many locations. A TDD relay center receives telephone calls from TDD users who request, via TDD, for a relay operator to place a call with a second party for them. The relay operator then calls the second party and tells the second party what the TDD caller is typing. When the second party talks, the operator then types back to the TDD caller. Conversely, a call through the relay center may originate from a non-TDD user wishing to communicate with a TDD user. The call then proceeds in the same manner.

Calls placed through a relay center can be frustrating in that they are slow and lack privacy. Those people that can speak, but not hear, may prefer to talk directly to the other party and have the operator type back the response. Similarly, a speech impaired caller would rather listen for themselves rather than have the operator interpret.

SUMMARY OF THE INVENTION

In accordance with the present invention, a voice bridge is incorporated into a TDD relay center that allows a voice to pass through a relay such that a hearing-impaired caller may speak directly to the other party. In the same way, a speech-impaired caller may listen to the other party and use a TDD to respond. By allowing voice to pass in one direction through the relay, the telephone calls are shorter and more like a conventional telephone call. The privacy of the caller increases in that the operator may be optionally prevented from hearing the voice portion of the conversation. In addition, the relay operator and the second party are prevented from hearing the TDD tones on the line, which may be loud and would otherwise prevent the operator from talking to the second party.

Where the option to prevent the operator from hearing the voice portion of the conversation is exercised, the task of the operator may be facilitated in that the operator does not have to distinguish between the voices of the two parties before typing. Such an arrangement is less burdensome and less confusing to the operator because only one half of the conversation needs to be monitored and interpreted.

It is an object of the present invention to allow voice and data to interchange automatically through the relay center.

It is a further object of the invention to shorten relay center calls.

It is yet another object of the invention to increase the privacy of the caller.

Further objects, features, and advantages of the invention will be apparent from the following detailed description taken in conjunction with the accompanying drawings.

DESCRIPTION OF THE PREFERRED EMBODIMENT

Figure 1:
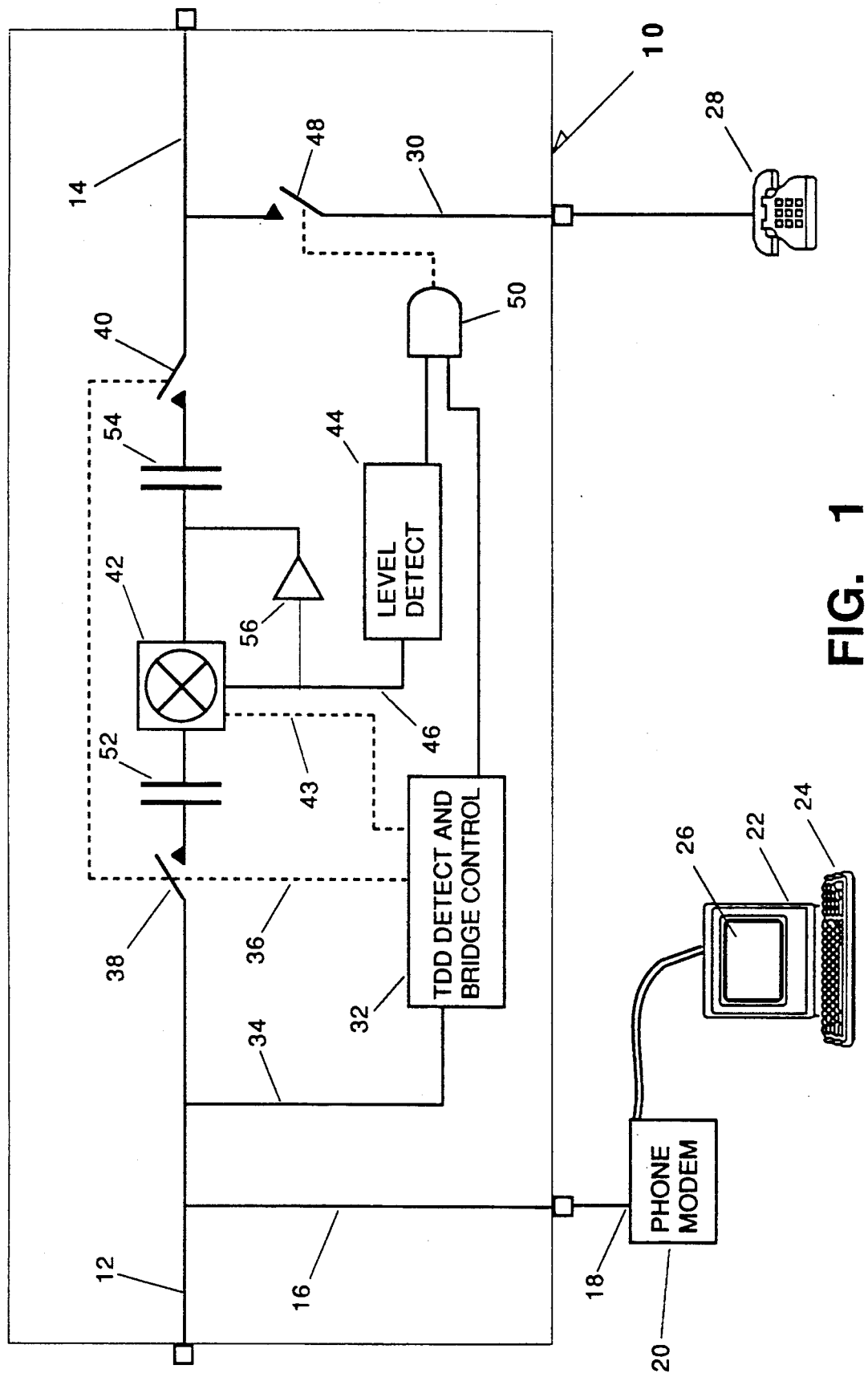
FIG. 1 is a schematic drawing of the voice bridge of the present invention, the switching arrangement representing the mode in which the voice bridge is disabled.

With reference to the drawings, a voice bridge for a relay center is shown at 10 in FIG. 1. A first telephone line 12 originates from a TDD (telecommunications devices for the deaf) user and a second telephone line 14 is connected to a non-TDD user. A TDD is comprised of a keyboard, a display, and a modem. During a typical relay call through the relay center without a voice bridge, a line 16 leading from the telephone line 12 is connected through a telephone link 18 to a modem 20. The modem 20 is then connected to a terminal or computer 22 having an associated keyboard 24 and display 26. Shown upon the display 26 is the message of the TDD user, which has been typed in at a keyboard of the TDD (not shown) of the TDD user, transmitted through the telephone line 12 by a modem of the TDD user (not shown), received by the modem 20, and translated back into a visual character set by the terminal or computer 22. A relay operator then reads the message to the non-TDD user over a telephone 28 which is connected to a line 30, the line 30 leading to the telephone line 14. When the non-TDD user responds, the message is transcribed by the relay operator to a character set by the keyboard 24, transmitted back through the telephone line 12 by the modem 20, received by the modem of the TDD user, and translated back into a character set by the computer or TDD of the TDD user. The telephone 28 is positioned proximate to the keyboard 24 and the display 26 so that the operator may operate the keyboard 24 and read the display 26 while manning the telephone 28. A TDD used by the operator is substitutable for the modem 20, the keyboard 24, and display 26, as a TDD comprises those elements.

To allow voice to pass from the telephone line 12 to the telephone line 14, or vice versa, the voice bridge 10 is used. In order to control the state of the voice bridge 10, circuitry to form a TDD detect and bridge control 32 is used. A line 34 from the telephone line 12 leads to the TDD detect and bridge control 32. The logic of the TDD detect and bridge control acts on a line 36 to open and close switches 38 and 40 in unison to disable or enable the voice bridge 10. When TDD signals are detected on the line 34 originating from the line 12 or the line 16 by the TDD detect and bridge control 32, the switches 3S and 40 are opened, thereby disabling the voice bridge 10. When TDD signals are not detected on the line 34, the switches 38 and 40 are closed to allow voice or other audio to pass from the line 12 to the line 14, or from the line 14 to the line 12, whichever the case may be. Where the TDD user is hearing impaired but capable of speech, the direction of voice or other audio is from the line 12 to the line 14. Where the TDD user is speech impaired but capable of hearing, the direction of voice or other audio is from the line 14 to the line 12. A bridge polarity reversal switch 42 controls the direction of voice or other audio through a line 43 and is discussed further below.

A level detect circuit 44 may, upon command of either the TDD user or operator be used as a privacy option to prevent audio sounds on either of the lines 12 or 14 from being carried to the telephone 28. For the case of the hearing impaired TDD user capable of speech, the direction of the audio on the voice bridge 10 is from the telephone line 12 to the telephone line 14 when the voice bridge 10 is enabled. The level detect circuit 44 detects the audio as carried on a line 46 leading from the bridge polarity reversal switch 42. Where the audio level is sufficient and the bridge 10 is enabled (the bridge 10 is enabled when there are no TDD signals on the telephone line 12), a switch 48 on the line 30 is opened to prevent audio on the line 12 from being carried to the telephone 28, thus providing privacy to the TDD user. An AND gate 50, or equivalent, controls the opening and closing of the switch 48. The switch 48 is normally closed, but the switch 4S is opened when the privacy option is invoked and signals representing both a sufficient audio sound from the level detect circuit 44 and an enabled voice bridge 10 is received by the AND gate 50.

Where the direction of the audio on the voice bridge 10 is from the telephone line 14 to the telephone line 12 (i.e., a speech impaired user who is capable of hearing), the level detect circuit 44 may be used, upon command, to detect audio sounds on the line 14. Where the privacy option is invoked, the audio level is sufficient, and the bridge 10 is enabled (the bridge 10 is enabled when there are no TDD signals on the telephone line 12) the switch 48 is opened so that privacy is provided to the non-TDD user.

The voice bridge 10 comprises two coupling transformers 52 and 54 connected in series, an amplifier gain control stage 56, the TDD detect and bridge control 32, the level detect circuit 44, and the bridge polarity reversal switch 42. In operation, there are five possible modes, each of the modes representing different switching arrangements and direction of audio sounds through the voice bridge 10.

In the first mode as depicted in FIG. 1, the voice bridge 10 is disabled to allow TDD data from the TDD user to be received by the modem 20 where it is fed to the terminal or computer 22 and converted to a character set. As shown in FIG. 1, the switches 38 and 40 are opened and the voice bridge 10 is disabled. The relay operator reads the message from the TDD user displayed upon the keyboard 24 over the telephone 28; the switch 48 is closed to allow the voice of the relay operator to be carried on the line 14. The voice of the non-TDD user is also carried back to the operator on the lines 14 and 30 so that the operator may transcribe the vocal message from the non-TDD user into a character set via the keyboard 24 and transmitted across the telephone line 12 by the modem 20.

A second mode of operation occurs when a hearing-impaired TDD user is capable of speech and privacy is not invoked when audio sounds are carried through the voice bridge 10 from the telephone line 12 to the telephone line 14. The bridge 10 from the line 12 to the line 14 may be requested by a string or sequence of characters typed in on the TDD user terminal (not shown) or on the operator terminal 22 such that the TDD detect and bridge control 32 is prompted to create the bridge through the line 43. The particular string or sequence of characters is pre-selected and known to the TDD user and the operator to prompt the creation of the bridge in a particular direction. For example, this second mode may be prompted by the entering of the command "/ bridge out" at the beginning of a line of character text. The "/ bridge out" command is meant to be exemplary; other character strings or sequences could be created to prompt the creation of the bridge. Such a command should be one that is not likely in normal conversation. The TDD detect and bridge control 32 detects the string of characters and enables the bridge 10 to operate in the direction of telephone line 12 to the telephone line 14 through the bridge polarity reversal switch 42. It is also possible that Touch Tone dialing signals of the TDD user phone arranged in a particular sequence may be used as a command to prompt the creation of the bridge. When the directional command specifying a voice bridge from the telephone line 12 to the telephone line 14 is received by the TDD detect and bridge control 32, the bridge 10 is immediately disabled when TDD signals are detected on the telephone line 12 (originating from either the TDD user or operator) so that the TDD signals are not sent through to either the telephone 2S or the telephone line 14, which would otherwise be a significant distraction to either the operator or the non-TDD user. The voice bridge 10 is enabled upon termination of TDD signals to allow the TDD user to speak to the non-TDD user. When the bridge from the telephone line 12 to the telephone line 14 is initially established, the system is preferably designed to automatically send a character set message back to the TDD user acknowledging that the bridge is established.

A third mode of operation is identical to the second mode except that a privacy mode may be invoked that prevents the operator from hearing the audio sounds originating on the telephone line 12. After the request and acknowledgement of a bridge from the telephone 12 to the telephone line 14, the TDD user may further invoke privacy by a second command comprised of either a TDD character sequence or a sequence of Touch Tone dialing signals of the TDD user phone. The particular string or sequence of characters is pre-selected and known to the TDD user and the operator to prompt the privacy option. For example, the TDD user would type in "/ privacy". The "/ privacy" command is meant to be exemplary; other character or touch tone sequences could be created to prompt the creation of the bridge. Such a command should be one that is not likely in normal conversation. When the voice bridge 10 is then enabled by the absence of TDD signals as soon as the TDD user speaks, the level detect circuit 44 cuts off the telephone 28 when the audio is detected on the line 12. The telephone 28 is cut off by the opening of the switch 48 in the manner described above. When there are no audio sounds or if TDD signals are carried on the line 12, the switch 48 closes so that the operator may converse with the non-TDD user on the telephone line 14. When the privacy mode is initially established, the system is preferably designed to automatically send a character set message back to the TDD user acknowledging that the privacy is established.

If the TDD user is speech impaired but capable of hearing, a fourth mode may be activated in which privacy is not invoked and where the voice bridge 10 carries the audio sounds from the telephone line 14 to the telephone line 12. The bridge 10 from the line 14 to the line 12 may be requested by a string of characters typed in on the TDD user terminal (not shown) or on the operator terminal such that the TDD detect and bridge control 32 is prompted to create the bridge through the line 43. For example, this fourth mode may be prompted by the entering of the command "/ bridge in" at the beginning of a line of character text. Such a command is not likely in normal conversation and the TDD detect and bridge control 32 detects the string of characters and enables the bridge 10 to operate in the direction of the telephone line 14 to the telephone line 12 through the bridge polarity reversal switch 42. The formation of the bridge may be alternately prompted by the Touch Tone dialing signals of the TDD user phone. When the directional command specifying a voice bridge from the telephone line 14 to the telephone line 12 is received by the TDD detect and bridge control 32, the bridge is immediately disabled when TDD signals are detected on the telephone line 12 (originating from either the TDD user or the operator) so that the TDD signals are not sent through to either the telephone 28 or the telephone line 14, which would again be a significant distraction to either the operator or the non-TDD user. The voice bridge 10 is enabled upon termination of TDD signals to allow the non-TDD user to speak to the TDD user. When the bridge from the line 14 to the line 12 is initially established, the system is preferably designed to automatically send a character set message to the TDD user acknowledging that the bridge is established.

A fifth mode of operation combines the voice bridge of the fourth mode and the privacy feature of the third mode. In this case, the operator is precluded from hearing the audio sounds of the non-TDD user. The request for privacy may be entered by the operator on behalf of the non-TDD user, or it may be entered by the TDD user. When the voice bridge 10 is then enabled by the absence of TDD signals as soon as the non-TDD user speaks, the level detect circuit 44 cuts off the telephone 30 when audio is detected on the line 14. The telephone 30 is cut off by the opening of the switch 48, in the manner discussed above.

Unlike a traditional conference bridge which allows all the sounds in both directions to be heard by the operator and the second party, then, the voice bridge 10 of the present invention prevents the TDD data sounds from being passed to the operator and the second party, and upon a desired command, prevents the operator from hearing the voice part of the conversation in one direction. The voice bridge 10 detects the TDD signals on the telephone line 12 and disables the voice bridge 10 automatically when such TDD signals are detected. Conversely, the bridge 10 is enabled when the transmission of TDD signals is terminated. The voice bridge 10 may be controlled by either the TDD user or by the operator.

It is understood that the invention is not confined to the particular construction and arrangement of parts herein illustrated and described, but embraces such modified forms thereof as come within the scope of the following claims.

What is claimed is:

1. A voice bridge for a relay center, the voice bridge comprising:
    (a) a first telephone line;
    (b) a modem capable of receiving and transmitting data signals over the first telephone line;
    (c) a terminal having a keyboard and a display, the terminal converting the data signals received by the modem into readable characters and projecting the characters upon the display, and the terminal transmitting data signals that are entered upon the keyboard through the modem;
    (d) a telephone that connects with a second telephone line, the telephone being positioned in such proximity to the keyboard and the display that an operator may read the characters exhibited on the display and voice any message formed by the characters into the telephone and the operator may transcribe any vocal message received on the telephone into the keyboard;
    (e) means for detecting data signals on the first telephone line to discriminate voice signals from data signals on the first telephone line; and
    (f) means responsive to the detecting means for switching the first telephone line from a first mode not connected with the second telephone line to a second mode connected with the second telephone line when the detecting means detects voice signals on the first telephone line, so that in the second mode, voice signals are passed directly between the first and second telephone lines.

2. The voice bridge of claim 1 wherein the means for switching the first telephone line from a connection with the modes to a connection with the second telephone line is activated when data signals over the first telephone line are terminated.

3. The voice bridge of claim 1 further comprising a reverse switch that, when activated, delects from a connection that passes voice signals from the first telephone line to the second telephone line or a connection that passes voice signals from the second telephone line to the first telephone line.

4. The voice bridge of claim 3 wherein the reverse switch is activated by a signal sent over the first telephone line.

5. The voice bridge of claim 3 wherein the reverse switch is activated by data signals entered upon the keyboard.

6. A voice bridge for a relay center, the voice bridge comprising:
    (a) a first telephone line;

(b) a modem capable of receiving and transmitting data signals over the first telephone line;

(c) a terminal having a keyboard and a display, the terminal converting the data signals received by the modem into readable characters and projecting the characters upon the display, and the terminal transmitting data signals that are entered upon the keyboard through the modem;

(d) a telephone that connects with a second telephone line, the telephone being positioned in such proximity to the keyboard and the display that an operator may read the characters exhibited on the display and voice any message formed by the characters into the telephone and the operator may transcribe any vocal message received on the telephone into the keyboard;

(e) means for detecting data signals on the first telephone line to discriminate voice signals from data signals on the first telephone line;

(f) first means responsive to the detecting means for switching the first telephone line from a first mode not connected to the second telephone line to a second mode connection with the second telephone line so that in the second mode voice signals are passed through the first and second telephone lines; and (g) second means for switching, the second means for switching disconnecting the telephone from the second telephone line when the voice signals of a sufficient pre-selected level are transferred between the first and second telephone lines.

7. The voice bridge of claim 6 wherein the voice signals are carried from the first telephone line to the second telephone line and the voice signals are carried on the first telephone line.

8. The voice bridge of claim 6 wherein the voice signals are carried from the second telephone line to the first telephone line and the voice signals are carried on the second telephone line.

9. The voice bridge of claim 6 wherein the second means for switching is activated by a signal sent over the first telephone line.

10. The voice bridge of claim 6 wherein the second means for switching is activated by data signals entered upon the keyboard.

11. A voice bridge for a relay center, the voice bridge comprising:

(a) a first telephone line;

(b) a modem capable of receiving and transmitting data signals over the first telephone line;

(c) a terminal having a keyboard and a display, the terminal converting the data signals received by the modem into readable characters and projecting the characters upon the display, and the terminal transmitting data signals that are entered upon the keyboard through the modem;

(d) a telephone that connects with a second telephone line, the telephone being positioned in such proximity to the keyboard and the display that an operator may read the characters exhibited on the display and voice any message formed by the characters into the telephone and the operator may transcribe any vocal message received on the telephone into the keyboard;

(e) a detector connected to the first telephone line detecting data signals on the first telephone line and discriminating voice signals from data signals on the first telephone line; and (f) a switch connected and operated by the detector to switch the first telephone from a first mode not connected with the second telephone line to a second mode connected with the second telephone line so that in the second mode voice signals from the second telephone line are passed to the first telephone line.

12. The voice bridge of claim 11 wherein the switch switching the first telephone line from a connection with the modem to the connection with the second telephone line is activated when data signals over the first telephone line are terminated.

13. A voice bridge for a relay center, the voice bridge comprising:

(a) a first telephone line;

(b) a modem capable of receiving and transmitting data signals over the first telephone line;

(c) a terminal having a keyboard and a display, the terminal converting the data signals received by the modem into readable characters and projecting the characters upon the display, and the terminal transmitting data signals that are entered upon the keyboard through the modem;

(d) a telephone that connects with a second telephone line, the telephone being positioned in such proximity to the keyboard and the display that an operator may read the characters exhibited on the display and voice any message formed by the characters into the telephone and the operator may transcribe any vocal message received on the telephone into the keyboard;

(e) a detector connected to the first telephone line detecting data signals on the first telephone line and discriminating voice signals from data signals on the first telephone line;

(f) a switch connected and operated by the detector to switch the first telephone line from a first mode not connected with the second telephone line to a second mode connected with the second telephone line so that in the second mode voice signals from the second telephone line are passed to the first telephone line; and (g) a second switch connected to disconnect the telephone from the second line when voice signals of a sufficient level are transferred from the first telephone line to the second telephone line.

14. A method of forming a voice bridge in a relay center, the method comprising the steps of:

(a) receiving data signals over a first telephone line;

(b) converting the data signals into readable characters and projecting the characters upon a display;

(c) reading and voicing any messages formed by the characters into a telephone that connects with a second telephone line;

(d) detecting data signals received over the first telephone line to discriminate between voice signals and data signals on the first telephone line; and (e) switching the first telephone line from a mode that receives data signals and does not pass the data signals to the second telephone line to a mode where voice signals on the first telephone line are connected to the second telephone line when voice signals are being received on the first telephone line.

15. A method of forming a voice bridge in a relay center, the method comprising the steps of:

(a) receiving data signals over a first telephone line;

(b) converting the data signals into readable characters and projecting the characters upon a display;
(c) reading and voicing any messages formed by the characters into a telephone that connects with a second telephone line;
(d) detecting data signals received over the first telephone line to discriminate between voice signals and data signals on the first telephone line; and
(e) switching the first telephone line from a mode that receives data signals and does not pass the data signals to the second telephone line to a mode where voice signals on the first telephone line are connected with the second telephone line when the data signals are terminated as detected in the detecting step.

16. A method of forming a voice bridge in a relay center, the method comprising the steps of:
   (a) receiving data signals over a first telephone line;
   (b) converting the data signals into readable characters and projecting the characters upon a display;
   (c) reading and voicing any messages formed by the characters into a telephone that connects with a second telephone line;
   (d) detecting data signals received over the first telephone line to discriminate between voice signals and data signals on the first telephone line;
   (e) switching the first telephone line from a mode that receives data signals and does not pass the data signals to the second telephone line to a mode where voice signals on the first telephone line are connected to the second telephone line depending on whether voice signals or data signals are being received on the first telephone line;
   (f) detecting the level of voice signals on the first telephone line; and
   (g) disconnecting the telephone from the second telephone line when the voice signals of the first telephone line are of a sufficient pre-selected level.

17. A method of forming a voice bridge in a relay center, the method comprising the steps of:
   (a) receiving data signals over a first telephone line;
   (b) converting the data signals into readable characters and projecting the characters upon a display;
   (c) reading and voicing any messages formed by the characters into a telephone that connects with a second telephone line;
   (d) detecting data signals received over the first telephone line to discriminate between voice signals and data signals on the first telephone line;
   (e) switching the first telephone line from a mode that receives data signals and does not pass the data signals to the second telephone line to a mode where voice signals on the first telephone line are connected to the second telephone line depending on whether voice signals or data signals are being received on the first telephone line;
   (f) detecting the level of voice signals on the second telephone line; and
   (g) disconnecting the telephone from the second telephone line when the voice signals of the second telephone line are of a sufficient pre-selected level.

* * * * *